Nov. 3, 1936.  R. A. FESSENDEN  2,059,221
TELEVISION SYSTEM
Original Filed Aug. 21, 1922   2 Sheets-Sheet 2
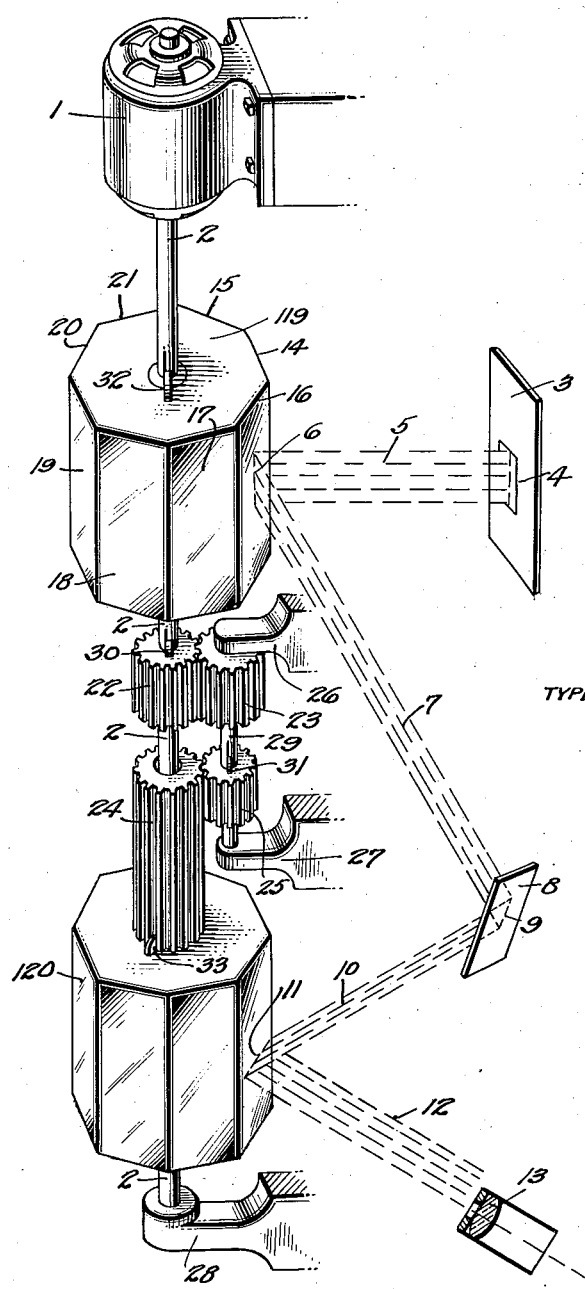
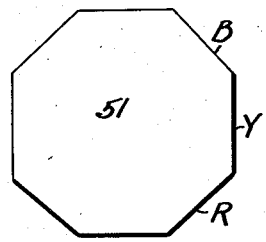
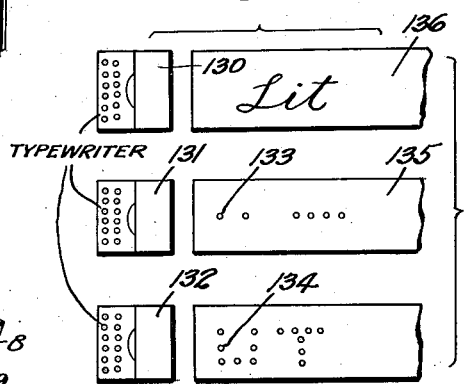

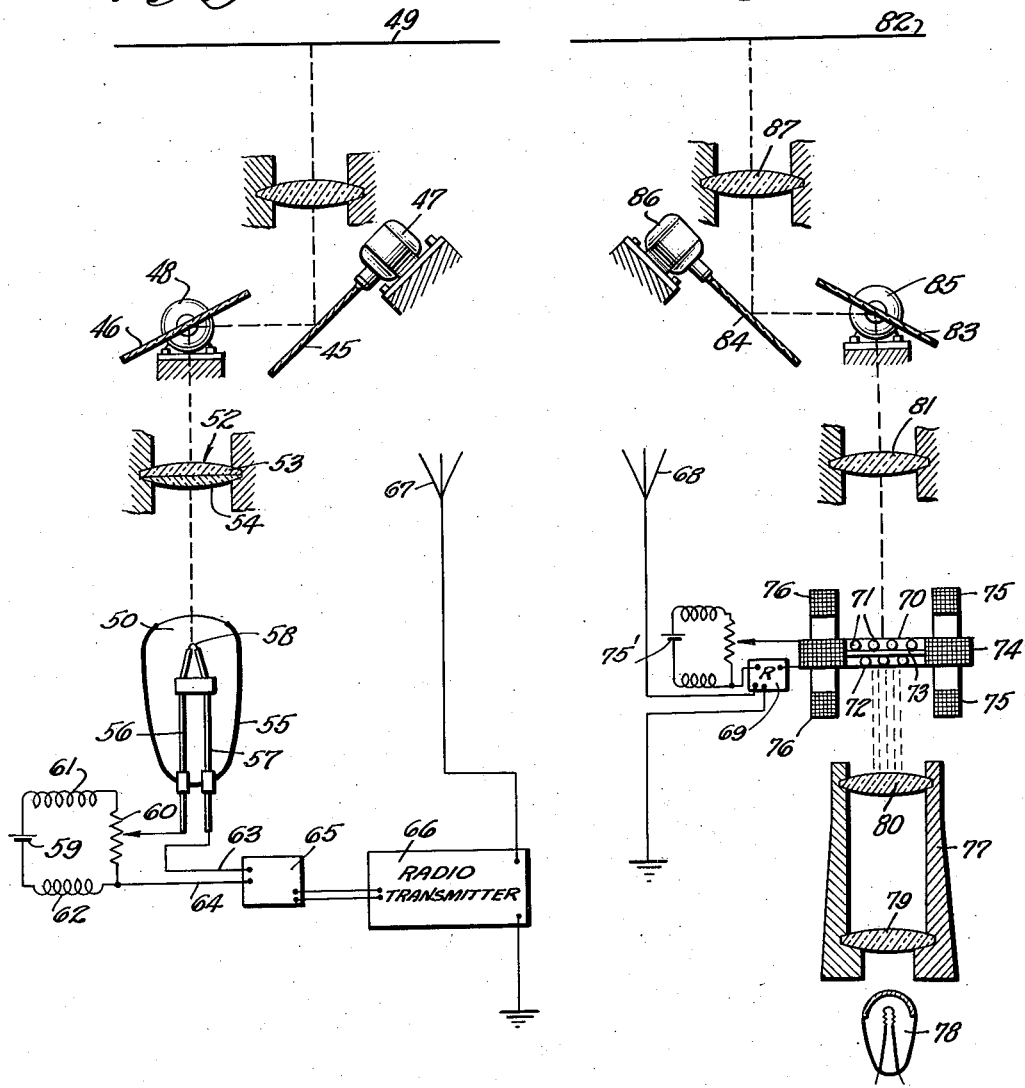

Patented Nov. 3, 1936

2,059,221

UNITED STATES PATENT OFFICE 2,059,221

TELEVISION SYSTEM

Reginald A. Fessenden, Chestnut Hill, Mass.; Helen M. Fessenden executrix of the estate of said Reginald A. Fessenden, deceased Original application August 21, 1922, Serial No. 583,271, now Patent No. 1,617,241, dated February 8, 1927. Divided and this application January 14, 1927, Serial No. 161,159

8 Claims. (Cl. 178—6)

This invention relates to the transmission of energy, and still more particularly of signals and pictures and moving pictures, by high frequency impulses, and more particularly by high frequency currents, and still more particularly by Hertzian waves; and to the elimination of the disturbing effect of atmospheric and other injurious influences; and to the reduction of the cost and uncertainty of transmission.

This application is a division of my Patent No. 1,617,241, granted February 8, 1927 upon an application Serial No. 583,271 filed August 21, 1922.

It has for its object the accomplishment of such of the subjects to which it relates which have not heretofore been accomplished; and increased efficiency and simplicity and reliability and economy in such as have been accomplished.

In the drawings accompanying this specification, Figures 1 and 2 show partly diagrammatically the transmission and reception respectively of moving pictures. Figure 3 shows a form of a rotating mirror in section that may be used in the present system. Figure 4 shows a mirror system that forms a part of the present invention, and Figure 5 shows a method of establishing the elements which may form a part of the transmitted message or image.

In Figure 1, 45 and 46 are rotating mirrors which may be made of such material as stellite, magnalium, silvered glass or other suitable material, the axis of the mirror 45 being in the plane of the paper, and that of the mirror 46 perpendicular thereto. These mirrors may be driven by motors 47 and 48 respectively, whose speeds may be maintained uniform in any suitable manner or a single motor may be used or the two axes may be geared together as shown in Figure 4.

The two mirrors form a sort of a rotating scanning system and if the plane of the field of view to be transmitted be taken as perpendicular to the paper and containing line 49 as one element, then the rotation of the mirror 46 will throw on the light or heat actuated cell 50 (since the device is capable of transmitting heat pictures as well as light pictures and so useful in detecting battleships, airplanes, motors and so forth at night and in a fog) a succession of small areas from along the line 49. If the mirror 45 should be rotated the strip of line will be taken from a different height in the field and successive strips will cover the whole field.

When both mirrors are rotating simultaneously these strips of areas will be inclined to the horizontal at an angle depending upon the relative speeds of the mirrors, and if it is to be desired to maintain them approximately horizontal, one of the mirrors, for example, 45, may be rotated many times faster than the other, 46; and preferably an even number of times, which may be accomplished by so designing the gearing or the pole members of the driving motors, or to produce slow beats between approximately equal speeds as described below.

In place of using flat mirrors, as shown in Figures 1 and 2, prismatic mirrors with six or more sides may be used, as shown by 51 in Figure 3. By using these, when one end of a strip of areas is passing off from the light actuated cell 50, from one set or pair of mirrors, the beginning of another strip of areas can be made to be just beginning on another pair of mirror surfaces.

The angle of the field of view to be transmitted will depend upon the distance apart of the mirrors and their size, and this can be calculated in advance by optical methods or determined experimentally.

The mirrors 45 and 46 are shown as flat surfaces although spherical or cylindrical faced mirrors may be used for the purpose of focusing the line or rays as the case may be, or this focusing may be done by adjustment of the size and position of the lens 52 for concentrating the image elements upon the heat or light actuated cell 50.

The lens 52 may be built up of two different parts 53 and 54 to let through a desired spectrum, or in fact the lens may be so constructed to eliminate or admit some of the heat rays from the object viewed, depending upon the utility to which the system is to be applied. The light or heat responsive cell may be of any suitable type, for example, a cell sensitive to radiant energy as indicated in Figure 1. This cell may comprise an evacuated vessel 55 with two electrical connections 56 and 57 externally supporting the small thin sensitive cell elements 58 which may be of a fine gold wire, blackened and positioned to receive the heat or light rays from the lens 52, or any other element suitable for such purposes. The cell may be initially energized by means of the battery 59 through a drop wire 60, the choke coils 61 and 62 being used to provide a high impedance to the variations caused by the radiant energy impressed upon the cell element 58. The cell element 58 is connected by means of the leads 63 and 64 to an amplifier 65 which may be connected to a transmission circuit or as indicated in the drawings to a radio transmitter 66 for impressing the impulses in a suitable manner on the antenna 67. The amount of local current from the battery 59 which may be used to increase the sensitiveness of the cell 58 is adjusted by means of the drop wire 60 usually to about 1 milliampere. The best current, however, for varying conditions must be found by trial and adjustment. As indicated the cell is enclosed in a vacuum by means of the container 55 and this has proved to be preferable under most circumstances, but it is not however necessary under all conditions to keep the cell so enclosed but it may be surrounded by other means opaque or visually transparent to different spectral characteristics. In place of using a single cell element 58 a group of cell elements may be used, in which case if the cell elements are lined up in a line, the lens 52 may be made cylindrical so as to concentrate the image of the small picture area in a line so that all of the energy may be impressed upon the cell 58.

When it is desired to transmit the picture in its natural colors, successive faces of the prismatic mirror 51 in Figure 3 may be coated with films to reflect respectively, red, yellow and blue, as indicated by the letters beside the faces of the prism at the right of the figure. It should be understood that any type of cell which is the equivalent of the cell here indicated might be used in the present invention, among which are the sensitive thermo-couples light sensitive vacuum tube cells, alkalines, metal amalgum cells, selenium cells suitably shunted to give rapid response to other known types.

In operation therefore, as each small picture area is reflected and focused upon the light responsive electro-translating device, the latter generates an electric impulse proportional to the amount of light or heat falling on it, i. e. as emanated from the original small picture area. This minute electric impulse, with or without amplification, actuates the amplifier 65 and then modulates the transmitter 66.

Where the transmission is by wire lines or other conductors, the generator of the transmitting station may be omitted, and the modulating impulses, preferably amplified may be used for the reproduction.

This succession of small picture areas therefore sweeping over the light responsive electro-translating device modulates the transmitted current or radiation in accordance with the luminosity or temperature or luminosity or color of said picture areas.

This modulated current is received at the reproducing station, and there employed to reproduce the picture or the scene which is going on at the sending end, for example, a photograph, or a baseball game or a scene from an opera.

In Figure 2 the impulses may be received by means of the antenna 68 and impressed upon the receiving transmitter 69 for operating the light modulating cell or device 70. The device 70 for modulating the projected light in accordance with the receiving modulated impulses comprises a shuttle which the applicant has tested up to speeds of 1/200,000 of a second, using only a few microamperes of current.

This device which is described in the applicant's Patent No. 1,617,241, issued on application Serial No. 583,271, which was a division of the same application as the present application, consists of two rows of wires, 71 and 72, positioned and arranged in such a manner that the space between successive wires of one row are opposite the wires of the other row, so that when spaced in the path of the projector, a complete screen or shutter is provided. This of course is under normal conditions where the space between the wire 71 is smaller than the width of the wire 72. As will be explained later, an initial current may be used to energize the magnetic field so that a certain temporary strain may be placed upon the wires, and under these conditions the wires may be sufficiently drawn apart to allow a small amount of light to pass through. The wires 71 and 72 may be held by a frame 73 and may be connected to the receiver 69 so that the impulses received from the antenna 68 may be impressed through the receiver directly above the light modulating device. The grid so called may be placed in the magnetic field by means of the coil 74 energized from the direct current source 75. In this way when current is impressed upon the wire 71 in one direction, and 72 in the opposite direction, as is done by properly connecting the ends of the wires 71 and 72, the wires will move respectively in opposite directions and increase or open the space between the rows for the light to pass through. As indicated in Figure 2, for an impulse in one direction, the wire 71 may move to the left, while the wire 72 will move to the right. The amount of light let through in this manner will correspond to the illumination of the succession of small picture areas at the transmitting or observing stations.

As has been stated above, a predetermined amount of light may be allowed to pass through the shutter in the absence of or independent of the modulating current by passing an auxiliary or direct current or alternating current through the wires of the grid and by adjusting the current as shown in the magnetizing coil 74 or by building the grids sideways to each other.

When the light from the projector strikes the grids, the wires expand, and to take the slack out of the wires, an additional magnetic field, generated by the coils 75, and 76 is used, which taughtens the wires without disturbing their alignment; in fact making it more stable.

The wires 71 and 72 may be of any suitable size. Applicant has used wires as small as 1/10,000 inch, and as large as 1/1,000 inch. They can be left bright or lightly silver plated and dipped in sodium sulphate to blacken them after mounting. It is preferred to draw the wire with the silver sheath half the thickness of the gold core, wind the wire on two grid frames placed back to back, with the silver sheaths touching, solder the wires, or spot weld them to the frames, cut the two frames apart, and dissolve the wire sheaths.

The light to be projected through the shutter 70 is provided by means of the projector 77 which may have a continuous arc current lamp 78 or any lamp, providing a concentrated point source of light. A projector 77 may be provided with suitable lenses 78 and 80 for concentrating the light either in a point or line source, depending upon the position and shape of the shutter 70.

As indicated in Figure 2, a second lens 81 may be provided in the system beyond the shutter 70 to provide the proper light beam for ultimate reflection upon the projecting screen 82 by means of the mirror system including the mirrors 83 and 84 operated respectively by means of the motors 85 and 86. A further lens 87 may be provided for concentrating the light in a suitable manner just before projection on the screen 82.

While the form of shutter described in the present application has been found suitable by the applicant, the device shown in applicant's other United States patents as for instance, U. S. Patent No. 1,044,637, July 17, 1905, and No. 1,045,781, July 16, 1908 or any other suitable system may be used.

All natural periods of vibration may be eliminated by the methods shown in applicant's Patent No. 1,319,521, June 8, 1917 in which an absorbing system may be used to take up the resonant energy, as for instance a resonant circuit tuned to absorb the energy at resonance of the vibrations of the wires.

The reproduction process, it will be seen, is substantially a reproduction of what takes place at the sending end, with action reversed. These pairs of constantly revolving mirrors on axes, constantly shifting in phase, and inter-reflecting, the one at the sending station and the one at the reproducing end, are preferably driven at constant but adjustable speed. The relative speeds of each mirror 45, 46, are so adjusted that each picture area will recur sufficiently often to give the required persistence of vision, for example ⅕ second apart. This may be varied either by varying the speed of the whole system, or by varying the relative speeds, and the definition may be varied similarly. This recurrence may be effected by, amongst other ways, making one mirror turn only five times per second, and the other turn 5,000 or 50,000 per second, or in the case of a 25 sides mirror, in five seconds and one two thousandths of a second.

But it is preferred to so gear the mirror together that one makes 5 turns more per second than the other, for example, 45 makes five turns more than 46, and similarly for 83, 84.

The regulation of the mirror system need not be automatic. It has been found in practice that if the speed be wrong a distorted blur is seen, but that by changing the speed of the system, 83, 84, it gradually straightens out, becomes intelligible and erect. The mirrors are however, preferably fitted with fly wheels or the equivalent.

Pictures or messages may be sent in undecipherable code by tilting successive sides of the rotating mirrors as indicated in Figure 4 so as to make the picture area succeed each other at arbitrarily determined order, both horizontally and vertically. The chances of any one not knowing the exact angle for each mirror side detecting the message would be one in many millions. This method may be used for cipher purposes generally, and the message may be photographed. Even if an operating "seeing in" managed to strike the right speed of mirror 45 and the right ratio of speed of mirror 46, never-the-less what would appear on his mirror as two adjacent strips of mirror images would really be two non-adjacent complex curve strips of the picture actually sent, and so the reproduction made of the "seer-in" would be a crazy patch quilt.

In place of mounting the mirrors 45, 46 (83, 84) on different shafts greater accuracy on conjoint movement may be obtained by mounting them on the same shaft as in Fig. 4, one mirror, say 45 being fixed rigidly to the shaft, and the other 46, revolving about the shaft, and a gearing driving 46 around slowly relatively to 45.

In Figure 4, such a system as described above is shown, which may be applied both to the transmitting and receiving end. Here the entire system as mentioned is driven by the motor 1 driving the shaft 2 to which is keyed by the key 32 prismatic mirror 119, having faces 14, 16, 17, 18, 19, 20, 21 and 15, each having their faces tipped or tilted at slightly different angles which can be arbitrarily determined both horizontally and vertically, if desired.

The shaft 2 likewise drives the gears 22 which drives the gear 23 mounted on the shaft 29 in bearings 26 and 27. The shaft 29 carries the gear 25 keyed to the shaft by key 31, the gear 25 driving the gear 24 which drives the second prismatic mirror 120, which may have its faces arbitrarily tilted as the mirror 119. The mirror 119, however, is not driven by the shaft 2 directly but indirectly at a different speed, but in a position having its axis coinciding with that of the mirror 119 and the shaft 2. The mirror 119 may do the vertical scanning as indicated by the boundary 4 in the field 3 in which a line on the field is scanned in the sheet 5, reflected in the position indicated in Figure 4 from the face 16 in the sheet 7 which strikes the reflecting mirror 8 and reflects in the horizontal line 9, sending a sheet 10 which in turn is reflected by the face 11 into the horizontal beam 12 which, point for point is received by the lens system 13.

In this manner the upper mirror 119 scans the vertical line and the lower mirror scans the line horizontally in points.

Figure 5 shows the use of the invention for telegraphing and working multiplex on a single frequency, and eliminating atmospheric disturbances, and thereby reducing the size and cost of stations. Any suitable means of sending may be used, but it is preferred to use typewriters 130, 131, 132, which type the messages, thus giving a record at the sending end.

To transmit, a line or any convenient short portion as the dot 133 of the message is exposed to the mirror viewing the system. The lines exposed may be a line of the actually types message, as 134. Or the typewriter may be of the standard Morse sender type, which sends a Morse signal as in sheet 135, each time a key is struck, corresponding to the letter types on the paper, and this signal may be used to operate trip switches on a travelling band of incandescent lamps, a dot lighting one or two lamps, and a dash lighting two or four lamps, the trip switches being opened by another trip as the lights on the band pass back of the pulleys, or outside of the field of mirrors; or the typewriter may set up the actual letters in incandescent lamps on the travelling band of incandescent lamps, as with the Mergenthaler type setter, as shown at 136.

In each case the message is exposed to the mirrors and transmitted as above described in the case of the picture, and reproduced at the receiving end and where it is thrown on a screen and a corresponding number of typists take the message down each typist typing down the words which appear on the line which is allotted to him. If desired, the lines may be of different colors, as explained in connection with the transmission of colored pictures. Or by an optical arrangement of mirrors, each line may be made visible to the typist concerned and to no other, each line being reflected to a different position.

This message has the advantage that a considerable number of messages may be sent on the same wave length and received at different stations. For example, New York may send 12 messages, of which four may be received at London, two at Rome, three at San Francisco, one at Rio de Janeiro, and two at Warsaw. Or six messages may be sent out from New York to different stations, and simultaneously six may be received from other stations, or the same stations, New York sending the 1st, 3rd, 5th, 7th, 9th and 11th lines of the pictures message, and receiving on the other lines; and the same mirrors may be used for both sending and receiving, the reproduction screens being semi-transparent and the travelling incandescent lamp belts placed behind them, (or to one side if preferred) and the impulse modulating cell placed to one side.

In this system each station is allotted its part of the screen on which numerous messages may be sent out by one station on all parts of the screen the receiving station will only view that portion of the screen it should view to receive from the sending station.

When the grids 71, 72 etc., are used with an electro-magnetic field, especially a heterodyne field, it is preferred to balance the grid wires by shunts or otherwise. For example, if the wires of the left hand half of the grid 71 move to the right, those of the right hand half should move to the left. This may be done by winding 71 and 72 together on a threaded support. If this is not done fluctuations in the field will move the wires in the absence of signals. In use the field is adjusted until when the desired signals are being received the wires of the grid move approximately to the center of the spaces obtaining when no signals are being received. In this position the wires of the two grids are in line with each other, and the maximum amount of light and heat, approximately, passes through the grids and falls on the selenium cell or thermophone or equivalent device. When adjusted for working the wires need not have the same positions they have when no current or field is on, but may be at any desired distance therefrom, preferably an even number of spacings, or wire diameters.

Having now described the invention, what is claimed is:

1. In a system for secret signalling, a scanning device having a plurality of rotating mirrors positioned with their faces arbitrarily chosen tilting in different directions, and means adapting one group of said mirrors to scan in one direction and the other group to scan in a direction at an angle inclined thereto.

2. In a system of secret signaling, a scanning system comprising a plurality of prismatic mirrors, means mounting said mirrors in axes concentric one to the other but rotating at different velocities, and means associated with said mirrors for allowing one set to scan lines in one direction and the other set substantially transverse thereto.

3. In a system of secret signaling, a scanning device including a pair of prismatic mirrors, each having a number of faces joined one to the other at their edges, the faces being tipped at arbitrarily chosen angles one with the other, means for rotating said prisms about a common axis with which they are aligned and means adapted to translate a line scanned by the first mirror to point for point scanning in the second mirror.

4. In a system of secret signaling, a scanning system including a pair of prismatic mirrors, means for rotating said mirrors in a common axis on different speeds one to the other, and means adapted to have one of said mirrors scan a line and the other of said mirrors scan a point of said line.

5. In an apparatus for secret signaling, a scanning system comprising a plurality of prismatic mirrors having faces inclined at different predetermined angles, means for rotating said mirrors from the same source at velocities commensurate one with the other, and means for adapting one of said mirrors to scan a line substantially transverse to the line scanned by the other.

6. In a system for secret signaling, a scanning device having a plurality of rotating mirrors positioned with their faces arbitrarily chosen tilting in different directions, and means adapting one group of said mirrors to scan in one direction and the other group to scan in a direction at an angle of 90 degrees thereto.

7. In a system for secret signaling, a scanning device having two prismatic mirrors positioned with their faces substantially facing the same but at arbitrary corresponding directions, means for rotating each mirror and stationary mirror positioned to intercept the reflection from one prismatic mirror and convert it to direct rays at the second prismatic mirror.

8. In a system for secret signaling, a scanning device having two prismatic mirrors positioned at arbitrarily chosen directions, means for driving one of said mirrors from a rotating source, means gearing the second mirror to the first, and stationary reflecting means for reflecting rays received from one mirror to the second at a different angle from that which the rays impinge on the first mirror.

REGINALD A. FESSENDEN.